(12) United States Patent
Yu et al.

(10) Patent No.: US 12,295,022 B2
(45) Date of Patent: May 6, 2025

(54) TRANSMISSION CONTROL IN APPLICATION LAYER BASED ON RADIO BEARER QUALITY METRICS IN VEHICULAR COMMUNICATION

(71) Applicant: QUALCOMM Incorporated, San Diego, CA (US)

(72) Inventors: Lan Yu, Beijing (CN); Hong Cheng, Basking Ridge, NJ (US); Dan Vassilovski, Del Mar, CA (US); Shailesh Patil, San Diego, CA (US); Gavin Bernard Horn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 448 days.

(21) Appl. No.: 17/770,937

(22) PCT Filed: Nov. 16, 2020

(86) PCT No.: PCT/CN2020/128992
§ 371 (c)(1),
(2) Date: Apr. 21, 2022

(87) PCT Pub. No.: WO2021/104074
PCT Pub. Date: Jun. 3, 2021

(65) Prior Publication Data
US 2022/0417936 A1 Dec. 29, 2022

(30) Foreign Application Priority Data
Nov. 26, 2019 (WO) ................ PCT/CN2019/120886

(51) Int. Cl.
*H04W 72/542* (2023.01)
*H04W 4/40* (2018.01)

(52) U.S. Cl.
CPC .......... *H04W 72/542* (2023.01); *H04W 4/40* (2018.02)

(58) Field of Classification Search
CPC ..... H04W 72/542; H04W 4/40; H04W 28/24; H04W 4/46; H04W 28/0236;
(Continued)

(56) References Cited

U.S. PATENT DOCUMENTS

2016/0295624 A1  10/2016  Novlan et al.
2018/0376304 A1  12/2018  Cheng et al.
(Continued)

FOREIGN PATENT DOCUMENTS

CN  108770070 A  11/2018
CN  109314841 A   2/2019
(Continued)

OTHER PUBLICATIONS

3GPP TR 23.786: "3rd Generation Partnership Project, Technical Specification Group Services and System Aspects, Study on architecture Enhancements for EPS and 5G System to Support Advanced V2X Services (Release 16)", 3gpp Standard, Technical Report, Mobile Competence Centre, 650, Route Des Lucioles, F-06921 Sophia-Antipolis Cedex, France, vol. SA WG2, No. V0.9.0, Oct. 26, 2018, XP051487695, pp. 1-91, p. 16.
(Continued)

*Primary Examiner* — Kyaw Z Soe
(74) *Attorney, Agent, or Firm* — ArentFox Schiff LLP

(57) ABSTRACT

Methods, apparatuses, and computer-readable mediums for wireless communication are disclosed by the present disclosure. In an aspect, an application layer in a user equipment (UE) receives, from an access layer in the UE, a quality of service (QoS) indication comprising a metric that represents a quality of one or more radio bearers used for a vehicular communication with one or more other UEs. The application
(Continued)

layer performs a transmission control over the vehicular communication based on the QoS indication.

30 Claims, 9 Drawing Sheets

(58) Field of Classification Search
CPC .......... H04W 28/0263; H04W 28/0268; H04L 41/5009; H04L 41/5019; H04L 47/38
See application file for complete search history.

(56) References Cited

U.S. PATENT DOCUMENTS

| | | | |
|---|---|---|---|
| 2019/0053101 A1* | 2/2019 | Tsuda | H04W 52/18 |
| 2019/0124489 A1 | 4/2019 | Ahmad et al. | |
| 2019/0141142 A1 | 5/2019 | Filippou et al. | |
| 2022/0279389 A1 | 9/2022 | Xing et al. | |
| 2024/0187991 A1* | 6/2024 | Rydén | H04W 24/10 |

FOREIGN PATENT DOCUMENTS

| | | |
|---|---|---|
| WO | 2018016157 A1 | 1/2018 |
| WO | 2019161269 A1 | 8/2019 |
| WO | 2019196553 A1 | 10/2019 |
| WO | 2021098535 A1 | 5/2021 |

OTHER PUBLICATIONS

3GPP TS 23.287: "3rd Generation Partnership Project, Technical Specification Group Services and System Aspects, Architecture Enhancements for 5G System (5GS) to Support Vehicle-to-Everything (V2X) Services (Release 16)", 3gpp Standard, Technical Specification, Mobile Competence Centre, 650, Route Des Lucioles, F-06921 Sophia-Antipolis Cedex, France, No. V2.0.0, Aug. 21, 2019, pp. 1-50, XP051784455, pp. 19-20,25.
Huawei: "Solution on PC5 QoS Aspects", 3GPP Draft, S6-192186-FS_EV2XPP-PC5-QOS-SOLUTION, 3GPP TSG-SA WG6 Meeting #34, S6-192186, Mobile Competence Centre, 650, Route Des Lucioles, F-06921 Sophia-Antipolis Cedex, France, vol. SA WG6, No. Reno, Nevada US, Nov. 11, 2019-Nov. 15, 2019, Nov. 4, 2019, 3 pages, XP051813250, p. 3.
Interdigital Inc: "Key Issue #15 Update and Solution for UEs Connected via PC5 Interface", 3Gpp Draft, S2-1812025_SOLUTION_TO_KEY_ISSUE_15, SA WG2 Meeting #129bis, S2-1812025, Mobile Competence Centre, 650, Route Des Lucioles, F-06921 Sophia-Antipolis Cedex, France, vol. SA WG2, No. West Palm Beach, FL, USA, Nov. 26, 2018-Nov. 30, 2018, Nov. 20, 2018, XP051563551, 4 pages, p. 3.
Interdigital Inc: "QoS Management for NR V2X", 3GPP Draft, 3GPP RAN WG2 Meeting #106, R2-1906386, (R16 V2X Wi A1145 Qos Management for NR V2X), Mobile Competence Centre, 650, Route Des Lucioles, F-06921 Sophia-Antipolis Cedex, FR, vol. RAN WG2, No. Reno, USA, May 13, 2019-May 17, 2019, May 13, 2019, XP051729851, pp. 1-4, Section 2.3.
Supplementary European Search Report—EP20892732—Search Authority—Munich—Nov. 30, 2023.
Qualcomm Incorporated 3GPP TSG-RAN WG2 Meeting #104 R2-1817776 Discussion on QoS Design for NR PC5 Communication Nov. 16, 2018(Nov. 16, 2018) section 2.2.
International Search Report and Written Opinion issued in corresponding International Application No. PCT/CN2020/128992 dated Feb. 19, 2021.
International Search Report and Written Opinion—PCT/CN2019/120886—ISA/EPO—Aug. 24, 2020.
Qualcomm Incorporated: "Design Aspects and Requirements for QoS," 3GPP TSG-RAN WG1 Meeting #94bis, R1-1811267, Oct. 8-12, 2018 (Oct. 12, 2018), pp. 1-3, the whole document.
Nokia, et al., "Summary of AI 7.2.4.4, QOS Management", 3GPP TSG RAN WG1 #96, R1-1903330, Athens, Greece, Feb. 25, 2019-Mar. 1, 2019, Feb. 27, 2019, 9 pages, Section 2.
Qualcomm Incorporated: "Design Aspects and Requirements for QoS", 3GPP TSG RAN WG1 Meeting #95, R1-1813427, Spokane, USA, Nov. 12, 2018-Nov. 16, 2018, Nov. 3, 2018, pp. 1-6, Section 2.1-2.3.

* cited by examiner

TRANSMISSION CONTROL IN APPLICATION LAYER BASED ON RADIO BEARER QUALITY METRICS IN VEHICULAR COMMUNICATION

CROSS-REFERENCE TO RELATED APPLICATION(S)

This application claims the benefit of PCT Application Serial No. PCT/CN2019/120886, entitled "TRANSMISSION CONTROL IN APPLICATION LAYER BASED ON RADIO BEARER QUALITY METRICS IN VEHICULAR COMMUNICATION" and filed on Nov. 26, 2019, which is expressly incorporated by reference herein in its entirety.

BACKGROUND

Technical Field

The present disclosure relates generally to communication systems, and more particularly, to vehicular communication systems.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard.

There exists a need for further improvements in 5G NR technology, for example, relating to vehicular communication systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and non-transitory computer-readable mediums for wireless communication are disclosed by the present disclosure.

In an aspect, a method of wireless communication includes receiving, by an application layer in a user equipment (UE), from an access layer in the UE, a quality of service (QoS) indication comprising a metric that represents a quality of one or more radio bearers used for a vehicular communication with one or more other UEs. The method further includes performing, at the application layer, a transmission control over the vehicular communication based on the QoS indication.

In a further aspect, a UE for wireless communication includes a memory storing instructions and a processor in communication with the memory. The processor is configured to execute the instructions to receive, by an application layer in the UE, from an access layer in the UE, a QoS indication comprising a metric that represents a quality of one or more radio bearers used for a vehicular communication with one or more other UEs. The processor is further configured to perform, at the application layer, a transmission control over the vehicular communication based on the QoS indication.

In another aspect, a non-transitory computer-readable medium stores instructions that when executed by a processor cause the processor to receive, by an application layer in a UE, from an access layer in the UE, a QoS indication comprising a metric that represents a quality of one or more radio bearers used for a vehicular communication with one or more other UEs. The instructions further cause the processor to perform, at the application layer, a transmission control over the vehicular communication based on the QoS indication.

In a further aspect, a UE for wireless communication includes means for receiving, by an application layer in the UE, from an access layer in the UE, a QoS indication comprising a metric that represents a quality of one or more radio bearers used for a vehicular communication with one or more other UEs. The UE further includes means for performing, at the application layer, a transmission control over the vehicular communication based on the QoS indication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
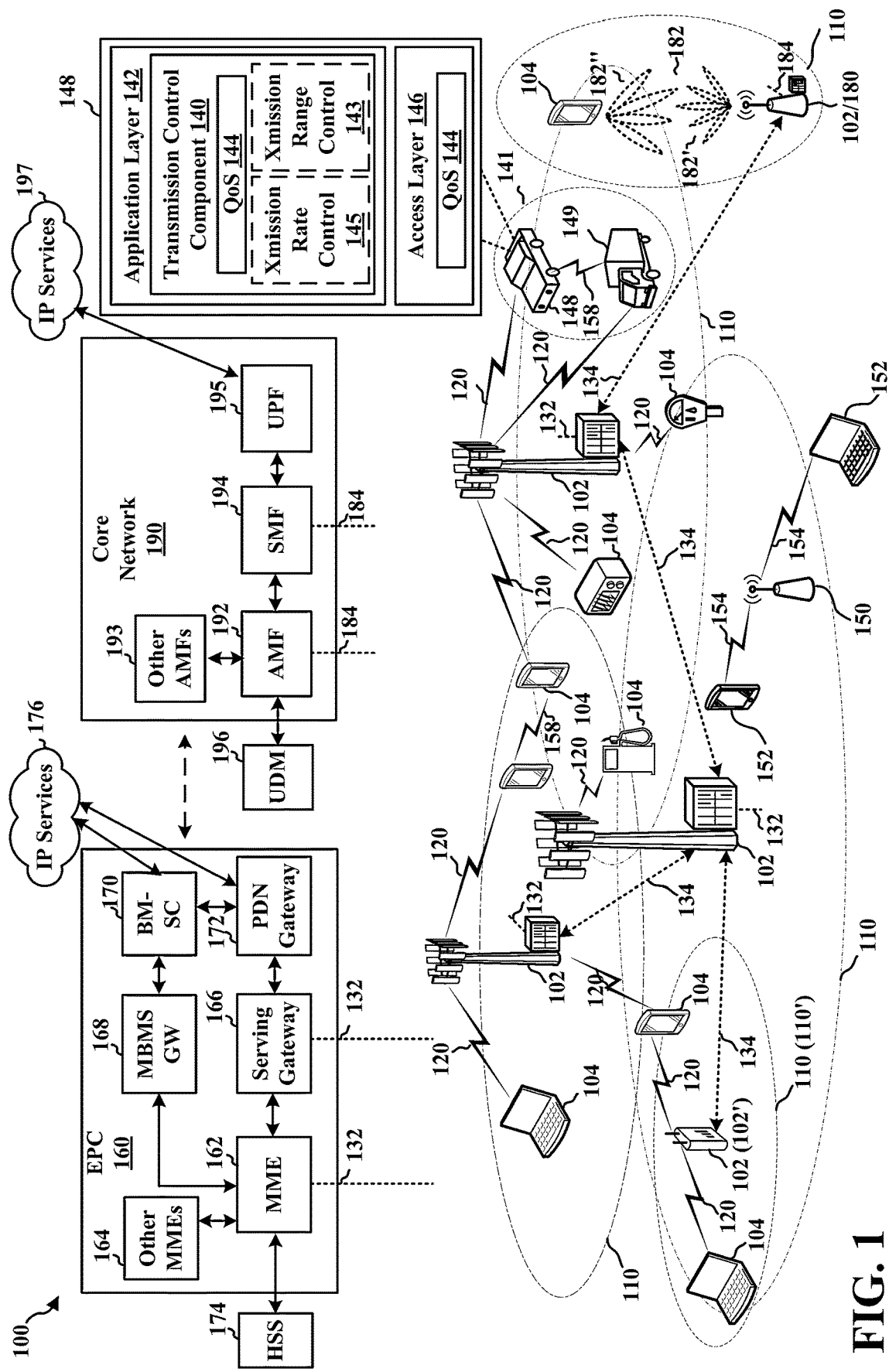
FIG. 1 is a schematic diagram of an example wireless communications system and an access network, according to some aspects.

The present aspects provide transmission control in an application layer of a user equipment (UE) based on one or more quality of service (QoS) indications received from a lower layer (e.g., an access layer) in vehicular communication systems (such as vehicle-to-vehicle (V2V), vehicle-to-pedestrian (V2P), vehicle-to-everything (V2X), enhanced vehicle-to-everything (eV2X), cellular vehicle-to-everything (C-V2X), etc.). In accordance with the described methods and features thereof, in some non-limiting aspects, for example, a UE such as a vehicle that is in V2X communication with one or more other UEs/vehicles may implement V2X congestion control and/or range control in the application layer based on one or more QoS indications provided by a lower layer such as an access layer. Accordingly, the present aspects may provide improved autonomous driving (e.g., in self-driving vehicles operating with reduced or zero human input) and/or improved driving experience (e.g., improved non-autonomous human driving).

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system 100 provides an access network and includes UEs 104 that may be configured for vehicular communication with other UEs 104. For example, in one non-limiting aspect, UEs 104 may include UEs 148 and 149 that are in V2X communication with each other, and the UE 148 may include/implement a transmission control component 140 operating in an application layer 142 and configured for enabling transmission control (such as transmission rate control 145, transmission range control 143, etc.) at the application layer 142 based on one or more QoS indications 144 provided by a lower layer (e.g., an access layer 146), for V2X communication with UE 149.

In an aspect, for example, the V2X communications may be carried over device-to-device (D2D) communication links 158 in a D2D communications system 141. Alternatively and/or additionally, the V2X communications may be sent (or at least partially assisted) via the network, and/or may be relayed, for example, by a road side unit (RSU) (not shown). The UEs 148 and 149 participating in the D2D communications 141 may include various devices related to vehicles and transportation. For example, the UEs 148 and 149 may include vehicles, devices within vehicles, vulnerable road users (VRUs) such as pedestrians, bicycles, segways, etc., or transportation infrastructure such as roadside devices (e.g., an RSU), tolling stations, fuel supplies, or any other device that may communicate with a vehicle. Further details of the operation of the UE 148 and the features of the present disclosure are described below with reference to FIGS. 2-9.

Still referring to FIG. 1, the wireless communications system 100 (also referred to as a wireless wide area network (WWAN)) further includes base stations 102, an Evolved Packet Core (EPC) 160, and/or another core network 190 (e.g., a 5G Core (5GC)). The base stations 102 may include macro cells (high power cellular base station) and/or small cells (low power cellular base station). The macro cells include base stations. The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with the core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or the core network 190) with each other over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

As mentioned above, certain UEs 104, such as the UE 148 and 149, may communicate with each other using D2D communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 702.11 standard, LTE, or NR. Additionally, the D2D communication link 158 may be implemented in vehicular systems, such as V2V, V2P, V2X, eV2X, C-V2X, etc.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same (e.g., 5 GHz, or the like) unlicensed frequency spectrum as may be used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

In an aspect, for example, the IP Services 176 and the IP Services 197 may be connected, for example, to allow for using the EPC in parallel for downlink MBMS transmission of the V2X messages.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or the core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Additionally, in the following discussion, the UE 104 may be associated with a vehicle, and so the term "vehicle" may inherently include the associated UE 104, and/or the described vehicular communication functionalities may be performed by the associated UE 104.

Currently, with advanced applications introduced for C-V2X, a vehicle may generate more messages as compared to legacy safety-only messages. For example, a vehicle may perform sensor sharing, intersection management, coordinated driving, V2P for pedestrian safety, etc. Therefore, due to the potentially large volume of over-the-air messages transmitted in a dense urban environment, congestion control may be necessary in order to avoid message collision and loss of safety-critical messages.

In some aspects, for example, a UE may implement distributed congestion control (DCC) at an upper layer (e.g., an application layer) to control the transmission rate. In an aspect, for example, according to the Society of Automotive Engineers (SAE), transmission rate control may be implemented by adaptive inter-transmission time (ITT) control based on vehicle density. In another aspect, for example, according to the European Telecommunications Standards Institute (ETSI), transmission rate control may be performed based on the motion state change of vehicles. However, the aforementioned transmission control methods for DCC may not account for the actual transmission status, e.g., the quality of the radio link. For example, parameters such as vehicle quantity, speed, acceleration, etc., may not accurately reflect the message transmission status. Therefore, transmission control based on such parameters may cause a UE to, for example, reduce transmission rate unnecessarily, not reduce transmission rate sufficiently, etc.

In contrast, some aspects of the present disclosure implement transmission control in the application layer for unicast and/or groupcast communications based on one or more lower layer QoS indications provided in NR V2X. In an aspect, the QoS indications may represent a transmission quality parameter of a radio bearer, reported by a lower layer such as an access layer. In an aspect, for example, using the QoS indications, the application layer may more accurately control message generation and perform transmission rate control. In an aspect, for example, for unicast, the QoS indications may include the bit rate, which may allow the application layer to adapt a video codec for content generation. In another aspect, for example, for groupcast, the QoS indications may be used by the application layer to adapt the range, thereby allowing the application layer to adjust autonomous driving behavior. In some aspects, for example, unicast and groupcast with link-level feedback may be implemented to support advanced applications in NR-V2X such as cooperative driving, intersection management, etc.

In an aspect, for example, such transmission rate control and/or range control and corresponding control parameters may be incorporated into standards, and the corresponding information exchange formats (e.g., message definitions, interface parameter definitions, etc.) may be standardized by C-V2X related groups, such as SAE, ETSI, cooperative SAE (C-SAE), cooperative intelligent transport systems (C-ITS), etc. In an aspect, for example, the interface to support the QoS indications from the access layer to the application layer, and the corresponding potential configuration interface, may be standardized in 3GPP (service and system aspect 2 (SA2), SA6, RAN2, etc.).

In an aspect, for example, DCC control at the application layer for broadcast messages may be performed based on limited input parameters such as traffic conditions detected in certain range and time. For example, the parameters used for DCC may include channel busy rate (CBR), vehicle density, etc. In an aspect, for example, vehicle density may be used for transmission rate control (e.g., by adjusting ITT), and CBR may be used for range control (e.g., by adjusting radiated power). However, vehicle density may not reflect the radio link status. For example, presence of more vehicles may not necessarily be indicative of congestion, and presence of fewer vehicles may not necessarily be indicative of fewer transmissions. Further, a CBR value may not necessarily be indicative of the actual message reception status, e.g., due to the likelihood of collision and/or interference.

In contrast, in some non-limiting aspects of the present disclosure, one or more NR V2X QoS indications may be used for performing DCC. In an aspect, for example, NR V2X QoS indications may be available according to 3GPP Technical Specification (TS) 23.287 clause 5.4. In an aspect, for example, a UE (such as a vehicle) may have NR V2X QoS requirements associated with each QoS flow and/or each Sidelink Radio Bearer (SLRB) used for NR V2X communication. In an aspect, for example, referring to FIG. 2, a V2X application layer 204 of a UE/vehicle (e.g., the UE 148 in FIG. 1) may send data packets 202 to a V2X layer 206 which acts as an interface layer between the V2X application layer 204 and an access layer 208 (which may also be referred to as an access stratum (AS) layer and includes the radio link control (RLC) layer, the MAC layer, and the physical (PHY) layer).

In an aspect, the V2X layer 206 applies PC5 QoS rules 210 to the data packets 202 and maps the V2X data packets 202 to PC5 QoS flows 212. Specifically, the V2X layer 206 applies PC5 QoS flow identifiers (PFIs) to the data packets 202 and generates the PC5 QoS flows 212 that each include the V2X data packets 202 that are marked with the same PFI. The V2X layer 206 also categorizes the PC5 QoS flows 212 as either IP 220 or non-IP 218, and passes the PC5 QoS flows 212 to the access layer 208. The access layer 208 performs mapping 214 of the PC5 QoS flows 212 to access layer resources, e.g., maps each PFI to a radio bearer 200. The access layer 208 then carries each PC5 QoS flow 212 over an L2 link 216 identified by source and destination L2 IDs and a mode of communication (e.g., broadcast, groupcast, unicast, etc.).

In an aspect, the access layer 208 implements QoS monitoring, e.g., monitors the QoS status of the L2 links 216 and provides corresponding feedback/indications to the upper layers, e.g., to the V2X application layer 204. In an aspect, for example, for groupcast and unicast, feedback control (e.g., hybrid automatic repeat request (HARQ)) may be implemented at the PHY layer and reported to the V2X application layer 204. In an alternative and/or additional aspect, for example, for the RLC layer, retransmission counts may be implemented (to indicate if a transmission has failed) and reported to the V2X application layer 204. In an alternative and/or additional aspect, for example, for broadcast, CBR may be used to control the transmission rate/range at the V2X application layer 204, or QoS may be inferred from groupcast and/or unicast feedback. In an aspect, for example, the aforementioned access layer QoS feedbacks/indications may be used as control inputs at the V2X application layer 204 for congestion control.

Figure 3:
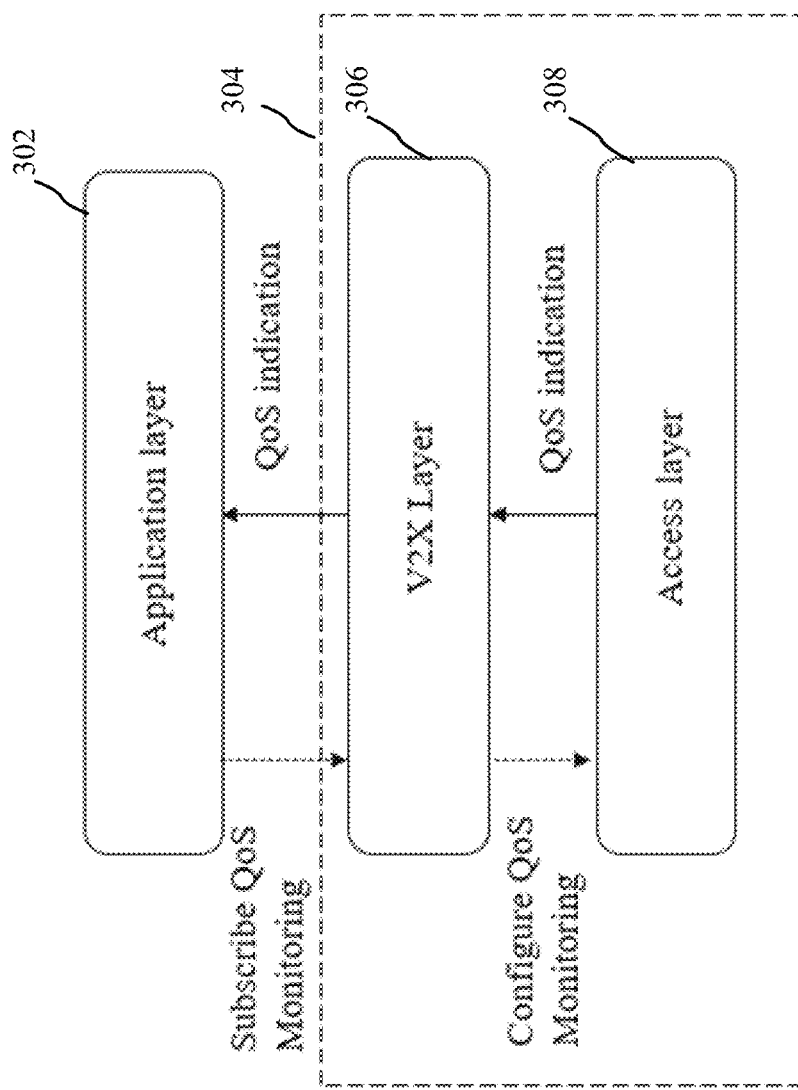
FIG. 3 is an example schematic diagram of Quality of Service (QoS)—related communications between various layers in a UE in the example wireless communications system of FIG. 1, according to some aspects.

In an aspect, for example, one or more NR V2X QoS indications may be used for performing DCC. Referring to FIG. 3, for example, in an aspect, an application layer 302 in a UE/vehicle (e.g., the UE 148 in FIG. 1) may perform transmission control (e.g., congestion control) based on one or more NR V2X QoS indications provided by a lower layer 304 relative to the application layer 302. In an aspect, for example, the application layer 302 that supports transmission control subscribes to QoS monitoring, e.g., subscribes to a V2X layer 306 that provides an interface with the access layer 308. In an aspect, based on QoS provisions in NR V2X, the access layer 308 provides one or more QoS indications to the application layer 302 via the V2X layer 306. In an aspect, for example, the access layer 308 may provide QoS indication statistics based on feedback, link status, etc. In an aspect, for example, the V2X layer 306 may process the QoS indications and associate the QoS indications to QoS flows/applications. In an aspect, for example, the application layer 302 may perform targeted adjustments based on the QoS indications. For example, in an aspect, based on a unicast rate indication, the application layer 302 may adapt to a new rate (e.g., instead of randomly reducing the rate). In another aspect, for example, based on groupcast NACK statistics, the application layer 302 may adjust the range to a more suitable one (e.g., instead of randomly reducing the range). For example, in an aspect, based on groupcast NACK statistics, the application layer 302 may determine that the reachable range is reduced.

In an aspect, for example, the QoS indications may include Packet Error Rate (PER), Packet Received Rate (PRR), average number of retransmissions, average PER or PRR for all transmissions, individual PER or PRR for every L2 link (radio bearer), ACK/NACK statistics for a particular L2 link (radio bearer), range statistics of a particular groupcast group (mapped to an L2 link/bearer), supported bit rate for a particular L2 link (radio bearer), etc. In an aspect, the QoS indication reporting pattern may be configured based on application layer requirements, and may be configured per QoS flow.

Figure 4:
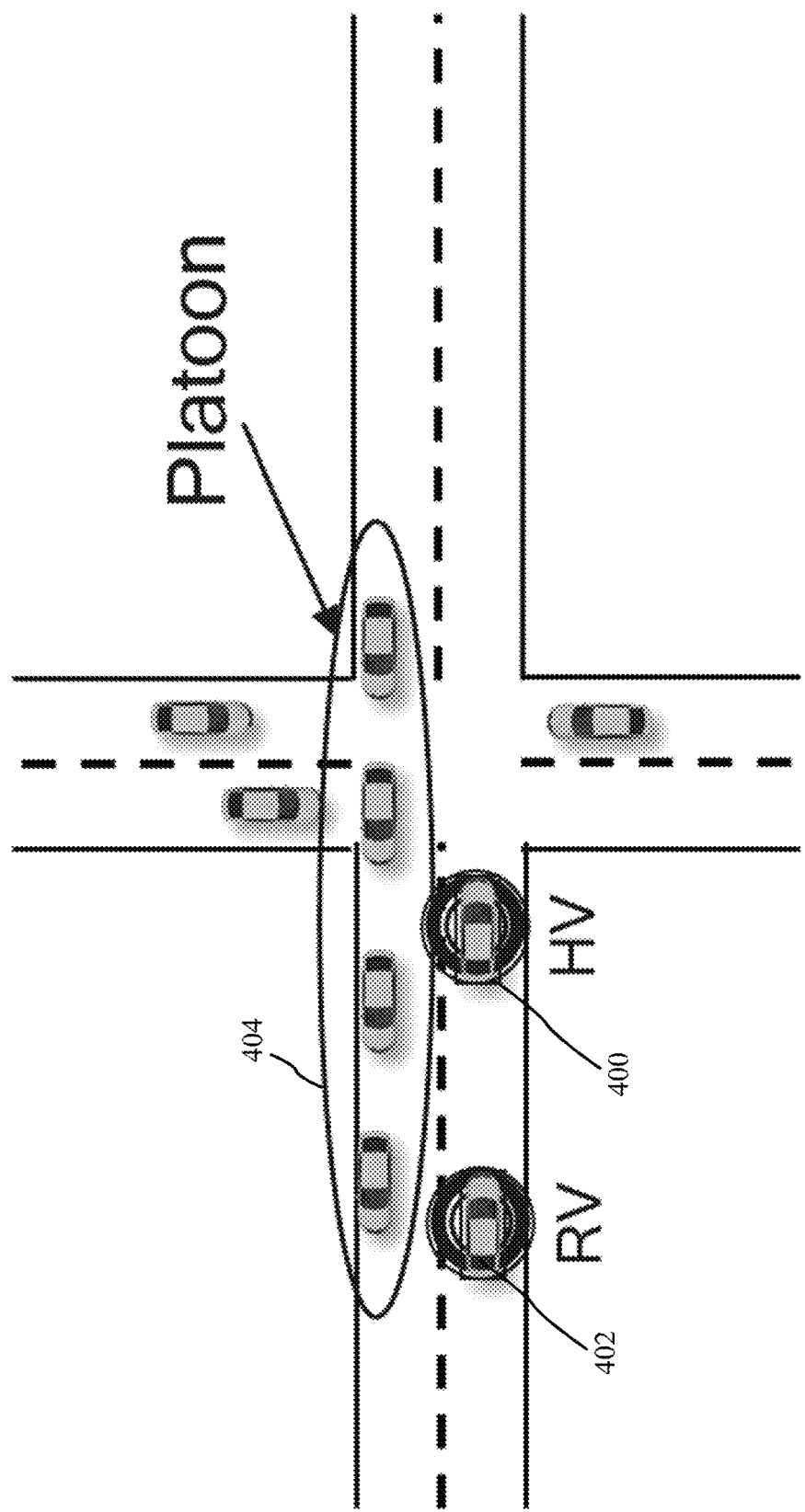
FIG. 4 is a schematic diagram of an example system for transmission control at the application layer for unicast communication, according to some aspects.

Referring to FIG. 4, for example, in an aspect, a host vehicle (HV) 400 (e.g., a vehicle/UE, such as the UE 148 in FIG. 1, that initiates a vehicular communication including, for example, a direct or indirect wireless communication exchange) may implement rate control over a unicast communication with a remote vehicle (RV) 402 (e.g., a vehicle, such as the UE 149 in FIG. 1, that is in proximity of a host vehicle that initiated a vehicular communication) based on access layer feedback. Specifically, in an aspect, for example, the host vehicle 400 and the remote vehicle 402 may share sensor data for, e.g., turning planning, intersection mobility assistance, etc. In one non-limiting aspect, for example, the host vehicle 400 and the remote vehicle 402 may share raw video data over a unicast link when the radio conditions are sufficiently good to support a high bit rate over the unicast link. However, the radio conditions may change and deteriorate when a platoon of vehicles 404 approaches the host vehicle 400 and/or the remote vehicle 402.

Specifically, the platoon of vehicles 404 may share control and/or sensor information among themselves using controlled groupcast communication. In an aspect, for example, the messages shared in the platoon of vehicles 404 may be power controlled and range controlled and therefore may not be seen/heard by other vehicles from a sufficient distance. However, once the platoon of vehicles 404 approaches the host vehicle 400 and/or the remote vehicle 402, the messages shared in the platoon of vehicles 404 may interfere with the sensor sharing unicast communication between the host vehicle 400 and the remote vehicle 402. In this case, based on one or more access layer QoS indications (e.g., NACK statistics, PER, etc.) reported to an application layer at the host vehicle 400 by an access layer at the host vehicle 400, the application layer may reduce the transmission rate of the unicast communication from the host vehicle 400 to the remote vehicle 402. For example, in an aspect, the application layer at the host vehicle 400 may determine that the bit rate for raw video data sharing with the remote vehicle 402 may no longer be supported due to deteriorated radio bearer conditions. In one non-limiting aspect, for example, the application layer at the host vehicle 400 may determine that only a lower video resolution corresponding to a new data rate of 50 Mbps may be supported. Accordingly, the application layer at the host vehicle 400 may adjust a video codec at the host vehicle and use compression to transfer video sensor data to the remote vehicle 402. In one non-limiting aspect, for example, the host vehicle 400 may adjust the video codec to use 4K high definition (HD) video level. In an aspect, for example, if the radio conditions further deteriorate, the host vehicle 400 may apply further compression and may further downgrade the video codec to, for example, 1080p HD video level.

Figure 5:
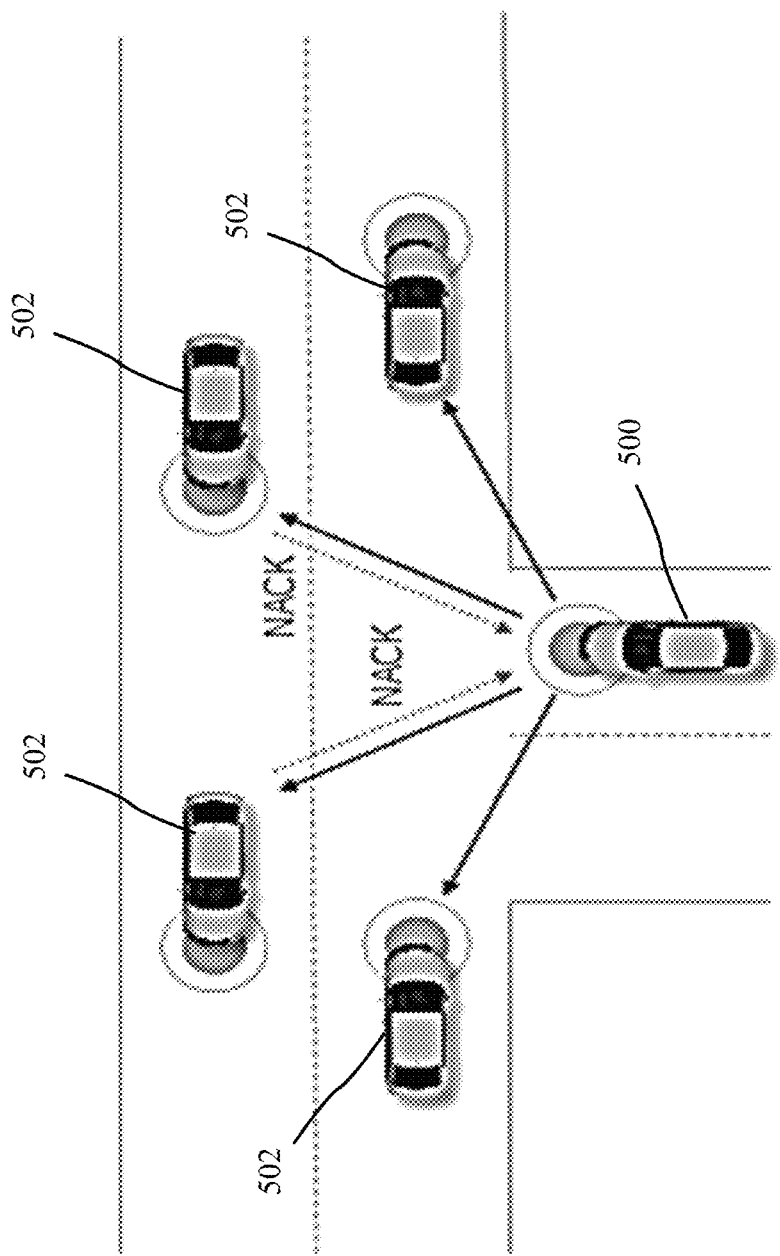
FIG. 5 is a schematic diagram of an example system for transmission control at the application layer for groupcast communication, according to some aspects.

Referring to FIG. 5, in another aspect, for example, a host vehicle 500 (e.g., the UE 148 in FIG. 1) may implement range control over a groupcast communication with one or more other vehicles 502 (e.g., the UE 149 in FIG. 1) based on access layer feedback. Specifically, in one non-limiting aspect, for example, the host vehicle 500 may groupcast to the other vehicles 502 for implementing cooperative/coordinated intersection crossing to safely cross an intersection. In an aspect, in NR-V2X, a predefined range requirement may be configured for certain applications. For example, a range requirement may be configured by the application layer for a lower layer for HARQ control in groupcast for an intersection management application. In an aspect, when the host vehicle 500 groupcasts to the other vehicles 502, the host vehicle 500 may receive one or more NACK feedbacks from the other vehicles 502 in response. In an aspect, the access layer at the host vehicle 500 may report PER for each individual receiver (for each one of the vehicles 502) to the application layer at the host vehicle 500. The access layer at the host vehicle 500 may also report the NACK feedbacks to the application layer at the host vehicle 500. Accordingly, based on the PER reports and the statistics of the NACK feedbacks (e.g., indicating the entities/vehicles the NACKs are received from), the host vehicle 500 may take an action regarding an application such as intersection management application.

For example, in an aspect, if the reachable range of the groupcast communication of the host vehicle 500 matches a minimum requirement of the intersection management application, the host vehicle 500 may continue a maneuver for intersection crossing. Otherwise, the host vehicle 500 may cancel the maneuver, postpone the maneuver, regenerate a driving strategy to match the reachable range, etc. Alternatively, based on the statistics of the NACKs received from the other vehicles 502, the host vehicle 500 may modify the range and change the maneuver operation expectations accordingly (e.g., by slowing down) or follow a normal stop and go operation instead of autonomous non-stopping intersection crossing.

Figure 6:
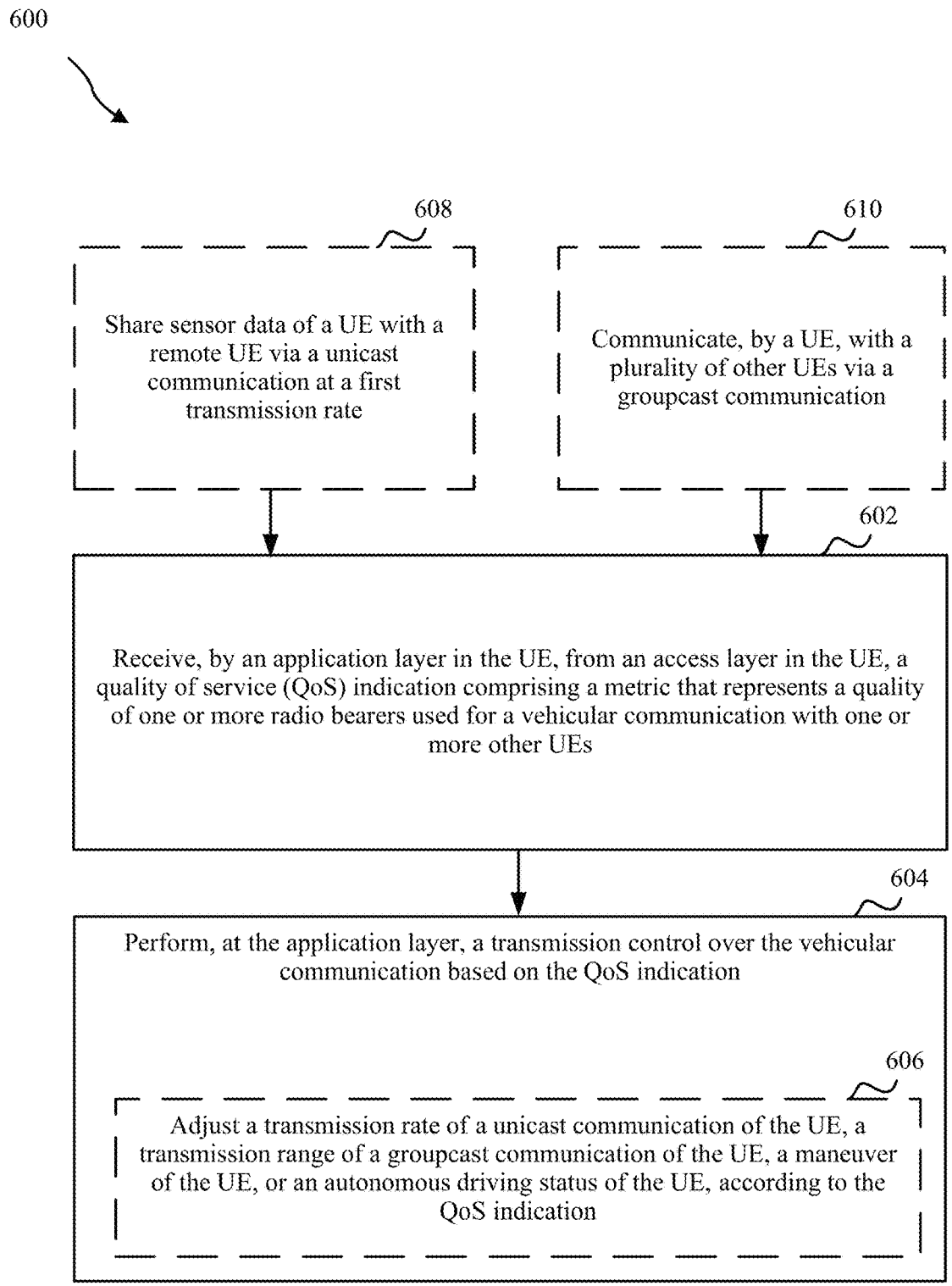
FIG. 6 is a flowchart of an example method of transmission control at the application layer based on one or more QoS indications from a lower layer, according to some aspects.

Referring to FIG. 6, a method 600 for wireless communication may be performed by an apparatus such as a UE 104 (e.g., the UE 148 in FIG. 1, the host vehicle 400 in FIG. 4, or the host vehicle 500 in FIG. 5), or more particularly, such as the transmission control component 140 being executed by a processor 712 of a UE 104 as described herein with reference to FIG. 7 below. In an aspect, for example, the method 600 of wireless communication may be performed by a UE 104 which may include a memory 716 (FIG. 7) and which may be the entire UE 104 or a component of the UE 104 such as the transmission control component 140, the modem 714 (FIG. 7), the processor 712 (FIG. 7), the transceiver 702 (FIG. 7), etc.

Figure 2:
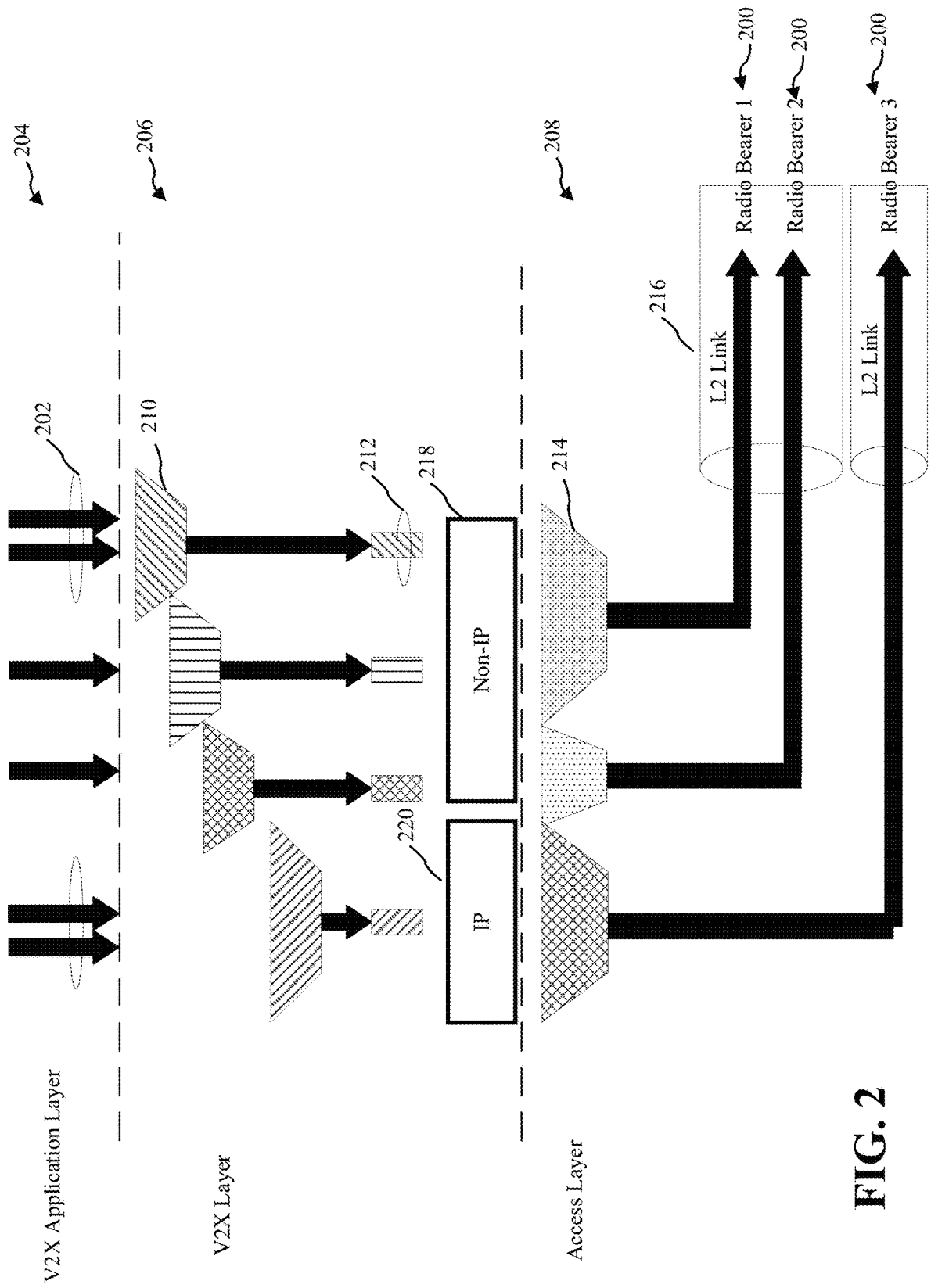
FIG. 2 is an example data flow diagram of data communication between various layers in a user equipment (UE) in the example wireless communications system of FIG. 1, according to some aspects.

At block 602 the method 600 for wireless communication includes receiving, by an application layer in a UE, from an access layer in the UE, a QoS indication comprising a metric that represents a quality of one or more radio bearers used for a vehicular communication with one or more other UEs. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may receive, by an application layer in a UE, from an access layer in the UE, a QoS indication comprising a metric that represents a quality of one or more radio bearers used for a vehicular communication with one or more other UEs. Accordingly, a UE 104, and/or a component of a UE 104 such as the transmission control component 140, the modem 714 (FIG. 7), the processor 712 (FIG. 7), the transceiver 702 (FIG. 7), etc., may provide means for receiving, by an application layer in a UE, from an access layer in the UE, a QoS indication comprising a metric that represents a quality of one or more radio bearers used for a vehicular communication with one or more other UEs. In an aspect, for example, as described herein with reference to FIG. 1, the UE 148, and/or a component of the UE 148 such as the transmission control component 140, the modem 714 (FIG. 7), the processor 712 (FIG. 7), or the transceiver 702 (FIG. 7), may receive the QoS indication 144 from the access layer 146, where the QoS indication 144 includes a metric that represents a quality of one or more radio bearers 200 (FIG. 2) used for a vehicular communication with one or more other UEs, such as the UE 149. In an aspect, for example, optionally, the metric may be indicative of a message reception performance as affected by a presence or an absence of message interference or collision in the one or more radio bearers 200 (FIG. 2). In an aspect, for example, the vehicular communication may be, for example, a V2V communication, a V2P communication, a V2X communication, an eV2X communication, a C-V2X communication, etc. In an aspect, for example, the vehicular communication may be carried over D2D communication links 158 in a D2D communications system 141. Alternatively and/or additionally, the vehicular communications may be sent (or at least partially assisted) via the network, and/or may be relayed, for example, by an RSU. The UEs 148 and 149 participating in the D2D communications 141 may include various devices related to vehicles and transportation. For example, the UEs 148 and 149 may include vehicles, devices within vehicles, VRUs such as pedestrians, bicycles, segways, etc., or transportation infrastructure such as roadside devices (e.g., an RSU), tolling stations, fuel supplies, or any other device that may communicate with a vehicle. The D2D communication link 158 may use one or more sidelink channels, such as a PSBCH, a PSDCH, a PSSCH, and a PSCCH. D2D communication may be through a variety of wireless D2D communications systems, such as for example, FlashLinQ, WiMedia, Bluetooth, ZigBee, Wi-Fi based on the IEEE 702.11 standard, LTE, or NR. Additionally, the D2D communication link 158 may be implemented in vehicular systems, such as V2V, V2P, V2X, eV2X, C-V2X, etc.

At block 604 the method 600 for wireless communication includes performing, at the application layer, a transmission control over the vehicular communication based on the QoS indication. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may perform, at the application layer, a transmission control over the vehicular communication based on the QoS indication. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for performing, at the application layer, a transmission control over the vehicular communication based on the QoS indication. In an aspect, for example, as described herein with reference to FIG. 1, the UE 148, and/or a component of the UE 148 such as the transmission control component 140, the modem 714 (FIG. 7), the processor 712 (FIG. 7), or the transceiver 702 (FIG. 7), may perform a transmission control, such as a transmission rate control 145, a transmission range control 143, etc., over the vehicular communication with the UE 149 based on the QoS indication 144 received from the access layer 146 of the UE 148.

Optionally, in an aspect, for example, block 604 may include block 606, and at block 606 the method 600 may further include adjusting a transmission rate of a unicast communication of the UE, a transmission range of a groupcast communication of the UE, a maneuver of the UE, or an autonomous driving status of the UE, according to the QoS indication. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may adjust a transmission rate of a unicast communication of the UE, a transmission range of a groupcast communication of the UE, a maneuver of the UE, or an autonomous driving status of the UE, according to the QoS indication. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for adjusting a transmission rate of a unicast communication of the UE, a transmission range of a groupcast communication of the UE, a maneuver of the UE, or an autonomous driving status of the UE, according to the QoS indication. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may adjust a transmission rate of a unicast communication of the host vehicle 400 with the remote vehicle 402 according to a QoS indication related to the unicast communication of the host vehicle 400 with the remote vehicle 402. In another aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may adjust a transmission range of a groupcast communication of the host vehicle 500 with the other vehicles 502, and/or adjust a maneuver of the host vehicle 500 and/or an autonomous driving status of the host vehicle 500, based on a QoS indication (such as a PER or a NACK statistic) related to the groupcast communication of the host vehicle 500 with the other vehicles 502.

Optionally, in an aspect, for example, the method 600 may further include block 608, and at block 608 the method 600 may further include sharing sensor data of the UE with a remote UE via a unicast communication at a first transmission rate. For example, in an aspect, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may share sensor data of the UE with a remote UE via a unicast communication at a first transmission rate. Accordingly, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may provide means for sharing sensor data of the UE with a remote UE via a unicast communication at a first transmission rate. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may share sensor data of the host vehicle 400 with the remote vehicle 402 via a unicast communication at a first transmission rate.

Optionally, in an aspect, for example, performing the transmission control at block 604 may include determining, by the application layer, based on the QoS indication, a second transmission rate supportable by the unicast communication. For example, in an aspect, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may determine, by the application layer, based on the QoS indication, a second transmission rate supportable by the unicast communication. Accordingly, a UE 104 (e.g., the UE 148 in FIG. 1), and/or a component of a UE 104 such as the transmission control component 140, the modem 714 (FIG. 7), the processor 712 (FIG. 7), the transceiver 702

(FIG. 7), etc., may provide means for determining, by the application layer, based on the QoS indication, a second transmission rate supportable by the unicast communication. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may determine, by the application layer of the host vehicle 400, based on the QoS indication from an access layer in the host vehicle 400, a second transmission rate supportable by the unicast communication between the host vehicle 400 and the remote vehicle 402.

Optionally, in an aspect, for example, performing the transmission control at block 604 may further include adjusting the unicast communication according to the second transmission rate. For example, in an aspect, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may adjust the unicast communication according to the second transmission rate. Accordingly, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may provide means for adjusting the unicast communication according to the second transmission rate. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may adjust the unicast communication between the host vehicle 400 and the remote vehicle 402 according to the second transmission rate determined based on the QoS indication related to the unicast communication between the host vehicle 400 and the remote vehicle 402.

Optionally, in an aspect, for example, adjusting the unicast communication may include performing ITT control at the UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may perform ITT control at the UE. Accordingly, a UE 104 (e.g., the UE 148 in FIG. 1), and/or a component of a UE 104 such as the transmission control component 140, the modem 714 (FIG. 7), the processor 712 (FIG. 7), the transceiver 702 (FIG. 7), etc., may provide means for performing ITT control at the UE. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may perform ITT control at the application layer of the host vehicle 400 based on QoS indication from an access layer of the host vehicle 400.

Optionally, in an aspect, for example, sharing sensor data at block 608 may include sharing video sensor data of the UE with the remote UE over the unicast communication. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may share video sensor data of the UE with the remote UE over the unicast communication. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for sharing video sensor data of the UE with the remote UE over the unicast communication. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may share video sensor data of the host vehicle 400 with the remote vehicle 402 over the unicast communication.

Optionally, in an aspect, for example, adjusting the unicast communication may include adjusting a video resolution of a video codec of the UE according to the second transmission rate supportable by the unicast communication. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may adjust a video resolution of a video codec of the UE according to the second transmission rate supportable by the unicast communication. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for adjusting a video resolution of a video codec of the UE according to the second transmission rate supportable by the unicast communication. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may adjust a video resolution of a video codec of the host vehicle 400 according to the second transmission rate supportable by the unicast communication between the host vehicle 400 and the remote vehicle 402 as indicated by a QoS indication related to the unicast communication between the host vehicle 400 and the remote vehicle 402.

Optionally, in an aspect, for example, receiving the QoS indication at block 602 may include receiving at least one of a PER or a NACK statistic related to the unicast communication with the remote UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may receive at least one of a PER or a NACK statistic related to the unicast communication with the remote UE. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for receiving at least one of a PER or a NACK statistic related to the unicast communication with the remote UE. In an aspect, for example, as described herein with reference to FIG. 4, the host vehicle 400, and/or a component of the host vehicle 400 such as the transmission control component 140 (FIG. 7), the modem 714 (FIG. 7), the processor 712 (FIG. 7), or the transceiver 702 (FIG. 7), may receive at least one of a PER or a NACK statistic related to the unicast communication of the host vehicle 400 with the remote vehicle 402.

Optionally, in an aspect, for example, the method 600 may further include block 610, and at block 610 the method 600 may further include communicating, by the UE, with a plurality of other UEs via a groupcast communication. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may communicate, by the UE, with a plurality of other UEs via a groupcast communication. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for communicating, by the UE, with a plurality of other UEs via a groupcast communication. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may communicate with the other vehicles 502 via a groupcast communication, e.g., for implementing a coordinated intersection crossing application.

Optionally, in an aspect, for example, receiving the QoS indication at block 602 may include receiving at least one of a PER or a NACK statistic related to the groupcast communication with the plurality of other UEs. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may receive at least one of a PER or a NACK statistic related to the groupcast communication with the plurality of other UEs. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for receiving at least one of a PER or a NACK statistic related to the groupcast communication with the plurality of other UEs. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may receive at least one of a PER or a NACK statistic related to the groupcast communication of the host vehicle 500 with the other vehicles 502 for implementing a coordinated intersection crossing application.

Optionally, in an aspect, for example, performing the transmission control at block 604 may further include determining, based on the at least one of the PER or the NACK statistic, that a reachable range of the UE fails to comply with a minimum range requirement of a vehicular application configured for controlling a maneuver of the UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may determine, based on the at least one of the PER or the NACK statistic, that a reachable range of the UE fails to comply with a minimum range requirement of a vehicular application configured for controlling a maneuver of the UE. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for determining, based on the at least one of the PER or the NACK statistic, that a reachable range of the UE fails to comply with a minimum range requirement of a vehicular application configured for controlling a maneuver of the UE. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may determine, based on a PER or a NACK statistic related to the groupcast communication of the host vehicle 500 with the other vehicles 502, that a reachable range of the host vehicle 500 fails to comply with a minimum range requirement of a vehicular application configured for controlling a maneuver of the host vehicle 500 such as crossing an intersection.

Optionally, in an aspect, for example, performing the transmission control at block 604 may further include cancelling or postponing the maneuver of the UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may cancel or postpone the maneuver of the UE. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for cancelling or postponing the maneuver of the UE. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may cancel or postpone the maneuver of the host vehicle 500, e.g., cancel or postpone a crossing of an intersection.

Optionally, in an aspect, for example, performing the transmission control at block 604 may further include regenerating a driving strategy of the UE to match the reachable range. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may regenerate a driving strategy of the UE to match the reachable range. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for regenerating a driving strategy of the UE to match the reachable range. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may regenerate a driving strategy of the host vehicle 500 to match the reachable range of the host vehicle 500 as indicated by a QoS indication (a PER or a NACK statistic) from an access layer in the host vehicle 500.

Optionally, in an aspect, for example, performing the transmission control at block 604 may further include modifying a range of the UE according to the reachable range. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may modify a range of the UE according to the reachable range. Accordingly, a UE 104 (e.g., the UE 148 in FIG. 1, the host vehicle 400 in FIG. 4, or the host vehicle 500 in FIG. 5), and/or a component of a UE 104 such as the application layer 142, the transmission control component 140, the modem 714 (FIG. 7), the processor 712 (FIG. 7), the transceiver 702 (FIG. 7), etc., may provide means for modifying a range of the UE according to the reachable range. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may modify a range of the host vehicle 500 according to the reachable range of the host vehicle 500 as indicated by a QoS indication (a PER or a NACK statistic) from an access layer in the host vehicle 500.

Optionally, in an aspect, for example, performing the transmission control at block 604 may further include adjusting the maneuver of the UE based on the modified range. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may adjust the maneuver of the UE based on the modified range. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for adjusting the maneuver of the UE based on the modified range. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may adjust the maneuver of the host vehicle 500 based on the range of the host vehicle 500 as modified according to a determined reachable range of the host vehicle 500.

Optionally, in an aspect, for example, modifying the range may include adjusting a radiated power of the UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may adjust a radiated power of the UE. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), etc., may provide means for adjusting a radiated power of the UE. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may modify a range of the host vehicle 500 by adjusting a radiated power of the host vehicle 500, according to a reachable range of the host vehicle 500 as determined based on a QoS indication (a PER or a NACK statistic) reported by an access layer in the host vehicle 500.

Optionally, in an aspect, for example, adjusting the maneuver may include slowing down the UE, following a stop and go operation at the UE, or exiting an autonomous driving mode at the UE. For example, in an aspect, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may slow down the UE, follow a stop and go operation at the UE, or exit an autonomous driving mode at the UE. Accordingly, a UE 104 (e.g., the UE 148 in FIG. 1, the host vehicle 400 in FIG. 4, or the host vehicle 500 in FIG. 5), and/or a component of a UE 104 such as the transmission control component 140, the modem 714 (FIG. 7), the processor 712 (FIG. 7), the transceiver 702 (FIG. 7), etc., may provide means for slowing down the UE, following a stop and go operation at the UE, or exiting an autonomous driving mode at the UE. In an aspect, for example, as described herein with reference to FIG. 5, the host vehicle 500, and/or a component of the host vehicle 500 such as the transmission control component 140 (FIG. 7), the modem 714 (FIG. 7), the processor 712 (FIG. 7), or the transceiver 702 (FIG. 7), may slow down the host vehicle 500, follow a stop and go operation at the host vehicle 500, or exit an autonomous driving mode at the host vehicle 500.

Optionally, in an aspect, for example, the maneuver may include a coordinated intersection crossing.

Optionally, in an aspect, for example, the QoS indication may include one or more of a PER, a PRR, an average number of retransmissions, an average PER, an average PRR, an ACK/NACK statistic, a range statistic of a groupcast group, or a supported bit rate for a radio bearer.

Optionally, in an aspect, for example, the vehicular communication may include an NR V2X communication.

In any of the above aspects, at least some of the functionality of a UE may be performed by a network component, an RSU, etc. For example, network components may be used for assisting in a communication between two or more UEs/vehicles and/or for assisting in any transmission control functionality described herein.

Figure 7:
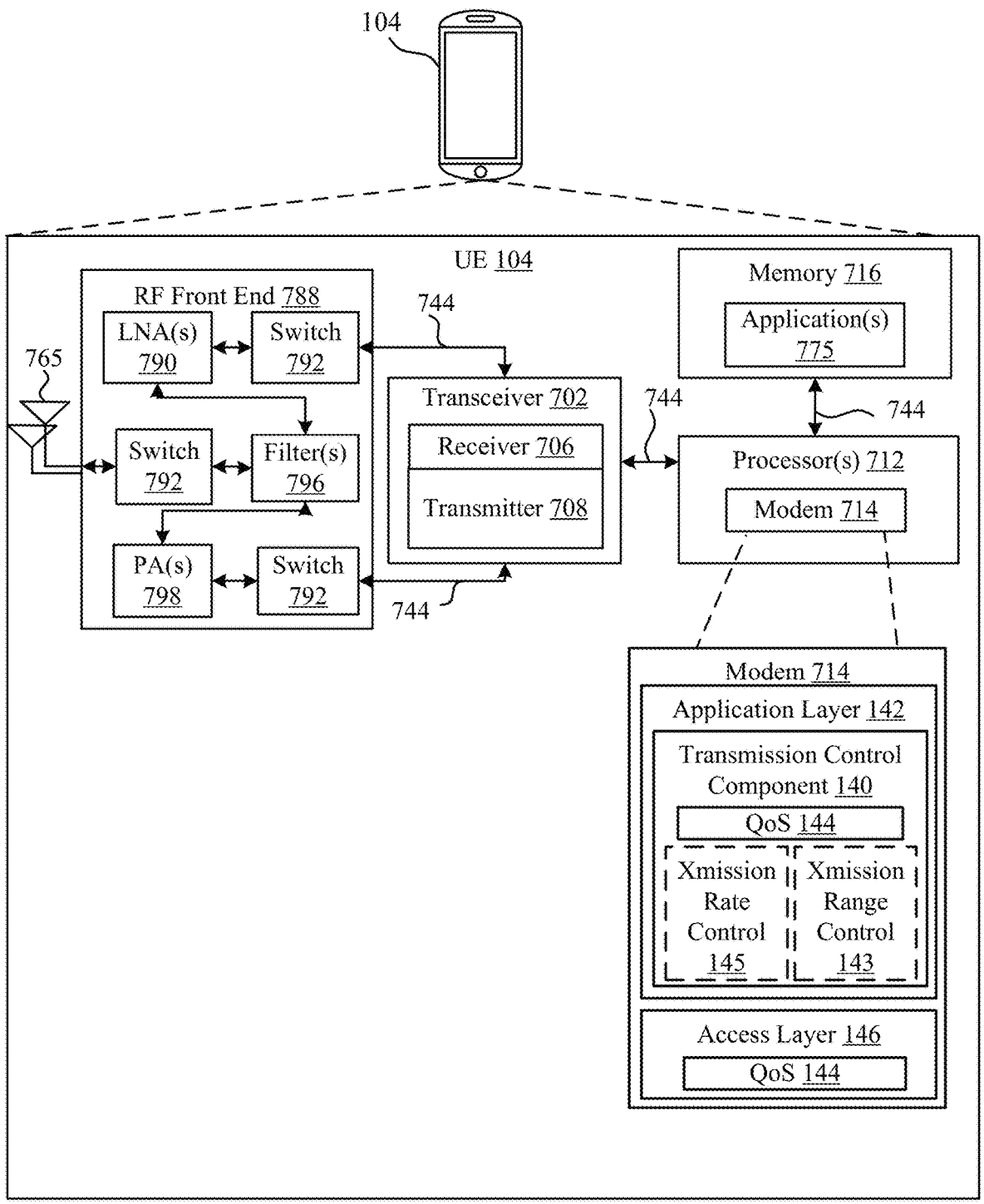
FIG. 7 is a schematic diagram of example components of a UE in FIG. 1, according to some aspects.

Referring to FIG. 7, one example of an implementation of the UE 104, which may be the UE 148 or the UE 149, may include a variety of components, some of which have already been described above, but including components such as one or more processors 712 and memory 716 and transceiver 702 in communication via one or more buses 744, which may operate in conjunction with modem 714 and the transmission control component 140 to enable one or more of the functions described herein related to V2X transmission control in FIG. 1. Further, the one or more processors 712, modem 714, memory 716, transceiver 702, RF front end 788, and one or more antennas 765, may be configured to support voice and/or data calls (simultaneously or non-simultaneously) in one or more radio access technologies. The antennas 765 may include one or more antennas, antenna elements, and/or antenna arrays.

In an aspect, the one or more processors 712 can include a modem 714 that uses one or more modem processors. The various functions related to the transmission control component 140 may be included in modem 714 and/or processors 712 and, in an aspect, can be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 714 associated with the transmission control component 140 may be performed by transceiver 702.

Also, memory 716 may be configured to store data used herein and/or local versions of applications 775, the transmission control component 140, and/or one or more of subcomponents thereof being executed by at least one processor 712. Memory 716 can include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining the transmission control component 140 and/or one or more of subcomponents thereof, and/or data associated therewith, when UE 104 is operating at least one processor 712 to execute the transmission control component 140 and/or one or more subcomponents thereof.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 102 or another UE 104. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may include, but is not limited to, an RF transmitter.

Moreover, in an aspect, UE 104 may include RF front end 788, which may operate in communication with one or more antennas 765 and transceiver 702 for receiving and transmitting radio transmissions, for example, wireless communications transmitted by at least one base station 102 or wireless transmissions transmitted by UE 104. RF front end 788 may be connected to one or more antennas 765 and can include one or more low-noise amplifiers (LNAs) 790, one or more switches 792, one or more power amplifiers (PAs) 798, and one or more filters 796 for transmitting and receiving RF signals.

In an aspect, LNA 790 can amplify a received signal at a desired output level. In an aspect, each LNA 790 may have a specified minimum and maximum gain values. In an aspect, RF front end 788 may use one or more switches 792 to select a particular LNA 790 and an associated specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 can be used by RF front end 788 to filter a received signal to obtain an input RF signal. Similarly, in an aspect, for example, a respective filter 796 can be used to filter an output from a respective PA 798 to produce an output signal for transmission. In an aspect, each filter 796 can be connected to a specific LNA 790 and/or PA 798. In an aspect, RF front end 788 can use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver may be tuned to operate at specified frequencies such that UE 104 can communicate with, for example, one or more base stations 102 or one or more cells associated with one or more base stations 102. In an aspect, for example, modem 714 can configure transceiver 702 to operate at a specified frequency and power level based on the UE configuration of the UE 104 and the communication protocol used by modem 714.

In an aspect, modem 714 can be a multiband-multimode modem, which can process digital data and communicate with transceiver 702 such that the digital data is sent and received using transceiver 702. In an aspect, modem 714 can be multiband and be configured to support multiple frequency bands for a specific communications protocol. In an aspect, modem 714 can be multimode and be configured to support multiple operating networks and communications protocols. In an aspect, modem 714 can control one or more components of UE 104 (e.g., RF front end 788, transceiver 702) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 8:
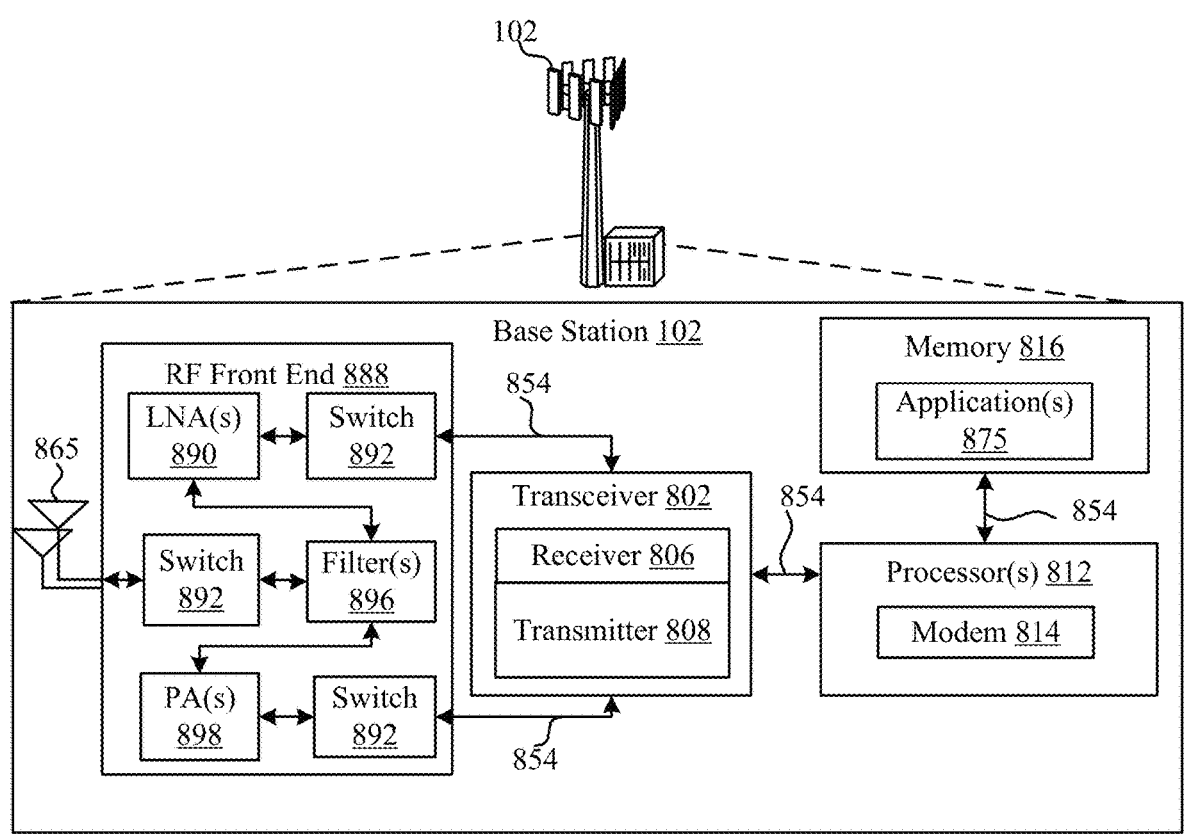
FIG. 8 is a schematic diagram of example components of a base station in FIG. 1, according to some aspects.

Referring to FIG. 8, one example of an implementation of a base station, which may be a base station 102 in FIG. 1, may include a variety of components, some of which have already been described above, but including components such as one or more processors 812 and memory 816 and transceiver 802 in communication via one or more buses 854, which may operate in conjunction with modem 814 to enable one or more of the functions described herein related to wireless communications. Further, the one or more processors 812, modem 814, memory 816, transceiver 802, RF front end 888, and one or more antennas 865, may be configured to support voice and/or data calls (simultaneously or non-simultaneously) in one or more radio access technologies. The antennas 865 may include one or more antennas, antenna elements, and/or antenna arrays.

The transceiver 802, receiver 806, transmitter 808, one or more processors 812, memory 816, applications 875, buses 854, RF front end 888, LNAs 890, switches 892, filters 896, PAs 898, and one or more antennas 865 may be the same as or similar to the corresponding components of UE 104, as described above, but configured or otherwise programmed for base station operations as opposed to UE operations.

Figure 9:
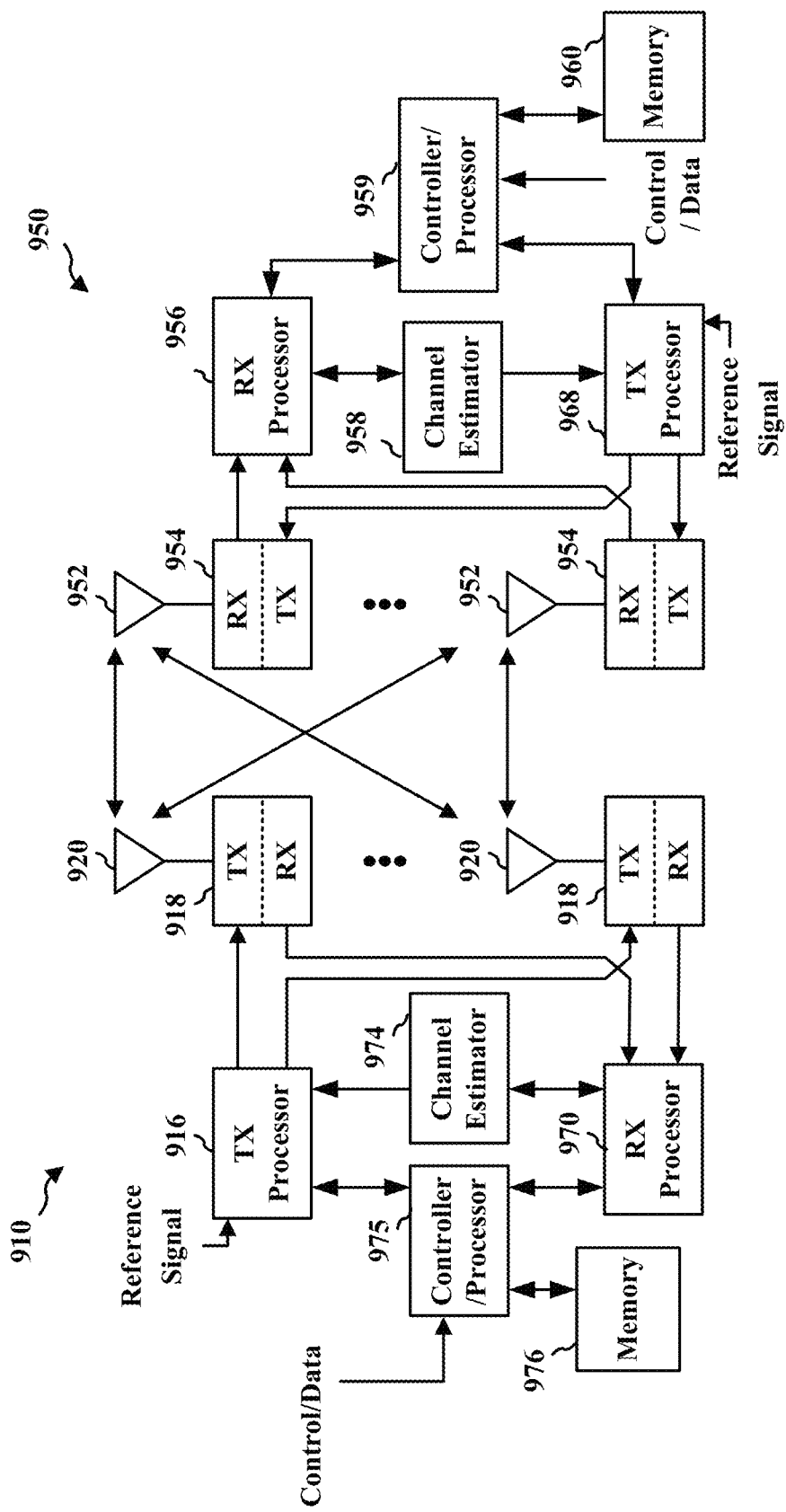
FIG. 9 is a diagram illustrating an example of a base station and a UE in an access network, according to some aspects.

FIG. 9 is a block diagram of a base station 910 in communication with a UE 950 in an access network, where the base station 910 may be the same as or may include at least a portion of a base station 102 in FIG. 1, and the UE 950 may be the same as or may include at least a portion of a UE 104 in FIG. 1. In the DL, IP packets from the EPC 160 may be provided to a controller/processor 975. The controller/processor 975 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 975 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 916 and the receive (RX) processor 970 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 916 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 974 may be used to determine the coding and modulation scheme, as well as for spatial processing. The channel estimate may be derived from a reference signal and/or channel condition feedback transmitted by the UE 950. Each spatial stream may then be provided to a different antenna 920 via a separate transmitter 918TX. Each transmitter 918TX may modulate an RF carrier with a respective spatial stream for transmission.

At the UE 950, each receiver 954RX receives a signal through its respective antenna 952. Each receiver 954RX recovers information modulated onto an RF carrier and provides the information to the receive (RX) processor 956. The TX processor 968 and the RX processor 956 implement layer 1 functionality associated with various signal processing functions. The RX processor 956 may perform spatial processing on the information to recover any spatial streams destined for the UE 950. If multiple spatial streams are destined for the UE 950, they may be combined by the RX processor 956 into a single OFDM symbol stream. The RX processor 956 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 910. These soft decisions may be based on channel estimates computed by the channel estimator 958. The soft decisions are then decoded and deinterleaved to recover the data and control signals that were originally transmitted by the base station 910 on the physical channel. The data and control signals are then provided to the controller/processor 959, which implements layer 3 and layer 2 functionality.

The controller/processor 959 can be associated with a memory 960 that stores program codes and data. The memory 960 may be referred to as a computer-readable medium. In the UL, the controller/processor 959 provides demultiplexing between transport and logical channels, packet reassembly, deciphering, header decompression, and control signal processing to recover IP packets from the EPC 160. The controller/processor 959 is also responsible for error detection using an ACK and/or NACK protocol to support HARQ operations.

Similar to the functionality described in connection with the DL transmission by the base station 910, the controller/processor 959 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 958 from a reference signal or feedback transmitted by the base station 910 may be used by the TX processor 968 to select the appropriate coding and modulation schemes, and to facilitate spatial processing. The spatial streams generated by the TX processor 968 may be provided to different antenna 952 via separate transmitters 954TX. Each transmitter 954TX may modulate an RF carrier with a respective spatial stream for transmission.

The UL transmission is processed at the base station 910 in a manner similar to that described in connection with the receiver function at the UE 950. Each receiver 918RX receives a signal through its respective antenna 920. Each receiver 918RX recovers information modulated onto an RF carrier and provides the information to a RX processor 970.

The controller/processor 975 can be associated with a memory 976 that stores program codes and data. The memory 976 may be referred to as a computer-readable medium. In the UL, the controller/processor 975 provides demultiplexing between transport and logical channels, packet reassembly, deciphering, header decompression, control signal processing to recover IP packets from the UE 950. IP packets from the controller/processor 975 may be provided to the EPC 160. The controller/processor 975 is also responsible for error detection using an ACK and/or NACK protocol to support HARQ operations.

At least one of the TX processor 968, the RX processor 956, and the controller/processor 959 may be configured to perform aspects in connection with the transmission control component 140 of a UE 104 (e.g., UE 148 or UE 149) in FIG. 1.

Some Further Aspects Include:

1. A method of wireless communication, comprising:
    receiving, by an application layer in a host user equipment (UE), from an access layer in the UE, a quality of service (QoS) indication comprising a metric that represents a quality of one or more radio bearers used for a vehicular communication with one or more other UEs; and
    performing, at the application layer, a transmission control over the vehicular communication based on the QoS indication.
2. The method of clause 1, wherein the metric is indicative of a message reception performance as affected by a presence or an absence of message interference or collision in the one or more radio bearers.
3. The method of any of the above clauses, wherein the performing comprises adjusting a transmission rate of a unicast communication of the UE, according to the QoS indication.
4. The method of any of the above clauses, wherein the performing comprises adjusting a transmission range of a groupcast communication of the UE, according to the QoS indication.
5. The method of any of the above clauses, wherein the performing comprises adjusting a maneuver of the UE, according to the QoS indication.
6. The method of any of the above clauses, wherein the performing comprises adjusting an autonomous driving status of the UE, according to the QoS indication.
7. The method of any of the above clauses, further comprising sharing sensor data of the UE with a remote UE via a unicast communication at a first transmission rate.
8. The method of any of the above clauses, wherein the performing comprises:
    determining, by the application layer, based on the QoS indication, a second transmission rate supportable by the unicast communication; and
    adjusting the unicast communication according to the second transmission rate.
9. The method of any of the above clauses, wherein the adjusting comprises performing inter-transmission time (ITT) control at the UE.
10. The method of any of the above clauses,
    wherein the sharing comprises sharing video sensor data of the UE with the remote UE over the unicast communication; and
    wherein the adjusting comprises adjusting a video resolution of a video codec of the UE according to the second transmission rate supportable by the unicast communication.
11. The method of any of the above clauses, wherein the receiving comprises receiving a packet error rate (PER) related to the unicast communication with the remote UE.
12. The method of any of the above clauses, wherein the receiving comprises receiving a negative acknowledgement (NACK) statistic related to the unicast communication with the remote UE.
13. The method of any of the above clauses, further comprising:
    communicating, by the UE, with a plurality of other UEs via a groupcast communication; and
    wherein the receiving comprises receiving at least one of a packet error rate (PER) or a negative acknowledgement (NACK) statistic related to the groupcast communication with the plurality of other UEs.
14. The method of any of the above clauses, wherein the performing comprises:
    determining, based on the at least one of the PER or the NACK statistic, that a reachable range of the UE fails to comply with a minimum range requirement of a vehicular application configured for controlling a maneuver of the UE.
15. The method of any of the above clauses, wherein the performing further comprises cancelling the maneuver of the UE.
16. The method of any of the above clauses, wherein the performing further comprises postponing the maneuver of the UE.
17. The method of any of the above clauses, wherein the performing further comprises regenerating a driving strategy of the UE to match the reachable range.
18. The method of any of the above clauses, wherein the performing further comprises:
    modifying a range of the UE according to the reachable range; and
    adjusting the maneuver of the UE based on the range.
19. The method of any of the above clauses, wherein the modifying comprises adjusting a radiated power of the UE.
20. The method of any of the above clauses, wherein adjusting the maneuver comprises slowing down the UE.
21. The method of any of the above clauses, wherein adjusting the maneuver comprises following a stop and go operation at the UE.
22. The method of any of the above clauses, wherein adjusting the maneuver comprises exiting an autonomous driving mode at the UE.
23. The method of any of the above clauses, wherein the maneuver comprises a coordinated intersection crossing.
24. The method of any of the above clauses, wherein the QoS indication comprises one or more of a Packet Error Rate (PER), a Packet Received Rate (PRR), an average number of retransmissions, an average PER, an average PRR, or an acknowledgement (ACK)/negative acknowledgement (NACK) statistic.
25. The method of any of the above clauses, wherein the QoS indication comprises a range statistic of a groupcast group.
26. The method of any of the above clauses, wherein the QoS indication comprises a supported bit rate for a radio bearer.
27. The method of any of the above clauses, wherein the vehicular communication comprises a new radio (NR) vehicle-to-everything (V2X) communication.

28. A non-transitory computer-readable medium storing instructions that when executed by a processor cause the processor to:
  receive, by an application layer in a user equipment (UE), from an access layer in the UE, a quality of service (QoS) indication comprising a metric that represents a quality of one or more radio bearers used for a vehicular communication with one or more other UEs; and
  perform, at the application layer, a transmission control over the vehicular communication based on the QoS indication.

The non-transitory computer-readable medium of clause 28, wherein the instructions further cause the processor to perform the method of any of the above clauses 1 to 27.

29. A user equipment (UE) for wireless communication, comprising:
  a memory storing instructions; and
  a processor in communication with the memory, wherein the processor is configured to execute the instructions to:
  receive, by an application layer in the UE, from an access layer in the UE, a quality of service (QoS) indication comprising a metric that represents a quality of one or more radio bearers used for a vehicular communication with one or more other UEs; and
  perform, at the application layer, a transmission control over the vehicular communication based on the QoS indication.

The UE of clause 29, wherein the processor is further configured to execute the instructions to perform the method of any of the above clauses 1 to 27

30. A user equipment (UE) for wireless communication, comprising:
  means for receiving, by an application layer in the UE, from an access layer in the UE, a quality of service (QoS) indication comprising a metric that represents a quality of one or more radio bearers used for a vehicular communication with one or more other UEs; and
  means for performing, at the application layer, a transmission control over the vehicular communication based on the QoS indication.

The UE of clause 30, further comprising means to perform the method of any of the above clauses 1 to 27.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
  receiving, by an application layer in a user equipment (UE), from an access layer in the UE, a quality of service (QoS) indication comprising a metric that represents a quality of one or more radio bearers used for a vehicular communication with one or more other UEs; and
  performing, at the application layer, a transmission control over the vehicular communication based on the QoS indication.

2. The method of claim 1, wherein the metric is indicative of a message reception performance as affected by a presence or an absence of message interference or collision in the one or more radio bearers.

3. The method of claim 1, wherein the performing comprises adjusting a transmission rate of a unicast communication of the UE, according to the QoS indication.

4. The method of claim 1, wherein the performing comprises adjusting a transmission range of a groupcast communication of the UE, according to the QoS indication.

5. The method of claim 1, wherein the performing comprises adjusting a maneuver of the UE, according to the QoS indication.

6. The method of claim 1, wherein the performing comprises adjusting an autonomous driving status of the UE, according to the QoS indication.

7. The method of claim 1, further comprising sharing sensor data of the UE with a remote UE via a unicast communication at a first transmission rate.

8. The method of claim 7, wherein the performing comprises:
  determining, by the application layer, based on the QoS indication, a second transmission rate supportable by the unicast communication; and
  adjusting the unicast communication according to the second transmission rate.

9. The method of claim 8, wherein the adjusting comprises performing inter-transmission time (ITT) control at the UE.

10. The method of claim 8,
  wherein the sharing comprises sharing video sensor data of the UE with the remote UE over the unicast communication; and wherein the adjusting comprises adjusting a video resolution of a video codec of the UE according to the second transmission rate supportable by the unicast communication.

11. The method of claim 7, wherein the receiving comprises receiving a packet error rate (PER) related to the unicast communication with the remote UE.

12. The method of claim 7, wherein the receiving comprises receiving a negative acknowledgement (NACK) statistic related to the unicast communication with the remote UE.

13. The method of claim 1, further comprising:
communicating, by the UE, with a plurality of other UEs via a groupcast communication; and
wherein the receiving comprises receiving at least one of a packet error rate (PER) or a negative acknowledgement (NACK) statistic related to the groupcast communication with the plurality of other UEs.

14. The method of claim 13, wherein the performing comprises:
determining, based on the at least one of the PER or the NACK statistic, that a reachable range of the UE fails to comply with a minimum range requirement of a vehicular application configured for controlling a maneuver of the UE.

15. The method of claim 14, wherein the performing further comprises cancelling the maneuver of the UE.

16. The method of claim 14, wherein the performing further comprises postponing the maneuver of the UE.

17. The method of claim 14, wherein the performing further comprises regenerating a driving strategy of the UE to match the reachable range.

18. The method of claim 14, wherein the performing further comprises:
modifying a range of the UE according to the reachable range; and
adjusting the maneuver of the UE based on the range.

19. The method of claim 18, wherein the modifying comprises adjusting a radiated power of the UE.

20. The method of claim 18, wherein adjusting the maneuver comprises slowing down the UE.

21. The method of claim 18, wherein adjusting the maneuver comprises following a stop and go operation at the UE.

22. The method of claim 18, wherein adjusting the maneuver comprises exiting an autonomous driving mode at the UE.

23. The method of claim 14, wherein the maneuver comprises a coordinated intersection crossing.

24. The method of claim 1, wherein the QoS indication comprises one or more of a Packet Error Rate (PER), a Packet Received Rate (PRR), an average number of retransmissions, an average PER, an average PRR, or an acknowledgement (ACK)/negative acknowledgement (NACK) statistic.

25. The method of claim 1, wherein the QoS indication comprises a range statistic of a groupcast group.

26. The method of claim 1, wherein the QoS indication comprises a supported bit rate for a radio bearer.

27. The method of claim 1, wherein the vehicular communication comprises a new radio (NR) vehicle-to-everything (V2X) communication.

28. A user equipment (UE) for wireless communication, comprising:
a memory storing instructions; and
a processor in communication with the memory, wherein the processor is configured to execute the instructions to:
receive, by an application layer in the UE, from an access layer in the UE, a quality of service (QoS) indication comprising a metric that represents a quality of one or more radio bearers used for a vehicular communication with one or more other UEs; and
perform, at the application layer, a transmission control over the vehicular communication based on the QoS indication.

29. The UE of claim 28, wherein the processor is further configured to execute the instructions to adjust a transmission rate of a unicast communication of the UE, according to the QoS indication.

30. The UE of claim 28, wherein the processor is further configured to execute the instructions to adjust a transmission range of a groupcast communication of the UE, according to the QoS indication.

* * * * *